United States Patent
Maltz

(10) Patent No.: US 11,080,896 B2
(45) Date of Patent: Aug. 3, 2021

(54) SYSTEMS AND METHODS FOR COMPUTED TOMOGRAPHY IMAGE RECONSTRUCTION

(71) Applicant: SHANGHAI UNITED IMAGING HEALTHCARE CO., LTD., Shanghai (CN)

(72) Inventor: Jonathan Maltz, Concord, CA (US)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 114 days.

(21) Appl. No.: 16/451,174

(22) Filed: Jun. 25, 2019

(65) Prior Publication Data

US 2020/0020140 A1 Jan. 16, 2020

(30) Foreign Application Priority Data

Jul. 10, 2018 (CN) .......................... 201810749469.3

(51) Int. Cl.
   *G06K 9/00* (2006.01)
   *G06T 11/00* (2006.01)

(52) U.S. Cl.
   CPC .......... *G06T 11/005* (2013.01); *G06T 11/006* (2013.01); *G06T 2207/10081* (2013.01); *G06T 2211/404* (2013.01); *G06T 2211/408* (2013.01); *G06T 2211/424* (2013.01)

(58) Field of Classification Search
   None
   See application file for complete search history.

(56) References Cited

U.S. PATENT DOCUMENTS

| 2016/0242720 A1* | 8/2016 | Ida | G06T 11/003 |
| 2017/0340304 A1* | 11/2017 | Qiulin | A61B 6/5264 |
| 2020/0085397 A1* | 3/2020 | Kobayashi | A61B 6/5211 |

* cited by examiner

*Primary Examiner* — Wei Wen Yang
(74) *Attorney, Agent, or Firm* — Metis IP LLC

(57) ABSTRACT

The present disclosure provides a method for computed tomography (CT) image reconstruction. The method may include obtaining a plurality of projection images of a subject. The plurality of projection images may be generated according to scan data acquired by a CT scanner at a plurality of gantry angles, each of the plurality of projection images corresponding to one of the plurality of gantry angles. The method may also include determining attenuation information of the plurality of projection images. The method may further include reconstructing a CT image of the subject by simultaneously solving correction coefficients of the plurality of projection images such that a difference between estimated attenuation information of the plurality of projection images and the attenuation information of the plurality of projection images is minimized.

20 Claims, 5 Drawing Sheets

500

Obtaining a plurality of projection images of a subject, the plurality of projection images being generated according to scan data acquired by a CT scanner at a plurality of gantry angles — 510

Determining attenuation information of the plurality of projection images — 520

Reconstructing a CT image of the subject by simultaneously solving correction coefficients of the plurality of projection images such that a difference between estimated attenuation information of the plurality of projection images and the attenuation information of the plurality of projection images is minimized, the estimated attenuation information of the projection images being relating to the CT image and the correction coefficients of the projection images — 530

500

```
┌─────────────────────────────────────────────────────┐
│ Obtaining a plurality of projection images of a     │
│ subject, the plurality of projection images being   │── 510
│ generated according to scan data acquired by a CT   │
│ scanner at a plurality of gantry angles             │
└─────────────────────────────────────────────────────┘
                          │
                          ▼
┌─────────────────────────────────────────────────────┐
│ Determining attenuation information of the          │── 520
│ plurality of projection images                      │
└─────────────────────────────────────────────────────┘
                          │
                          ▼
┌─────────────────────────────────────────────────────┐
│ Reconstructing a CT image of the subject by         │
│ simultaneously solving correction coefficients of   │
│ the plurality of projection images such that a      │
│ difference between estimated attenuation            │
│ information of the plurality of projection images   │── 530
│ and the attenuation information of the plurality of │
│ projection images is minimized, the estimated       │
│ attenuation information of the projection images    │
│ being relating to the CT image and the correction   │
│ coefficients of the projection images               │
└─────────────────────────────────────────────────────┘
```

FIG. 5

SYSTEMS AND METHODS FOR COMPUTED TOMOGRAPHY IMAGE RECONSTRUCTION

CROSS-REFERENCE TO RELATED APPLICATION

This application claims priority to Chinese Application No. 201810749469.3, filed on Jul. 10, 2018, the contents of which are incorporated herein by reference.

TECHNICAL FIELD

The present disclosure generally relates to computed tomography (CT) techniques, and more particularly, relates to systems and methods for reconstructing a CT image.

BACKGROUND

CT techniques are widely used in clinical examinations and medical diagnoses in recent years. During a CT scan of a subject, an X-ray imaging source and a detector may rotate with a gantry around the subject to scan the subject at a plurality of gantry angles. A plurality of projection images corresponding to the gantry angles may be generated based on the scan data. However, the radiation dose delivered to the subject may fluctuate when the gantry rotates, which may cause an inconsistency between projection images. For example, the fluctuation of the radiation dose delivered to the subject may result in a discrepancy between actual gray values and ideal gray values of a projection image. As used herein, ideal gray values of a projection image may refer to gray values resulted from a uniform radiation dose. When a CT image of the subject is reconstructed based on the projection images, the CT image may have a poor imaging quality, which may cause a false medical diagnosis or an inaccurate treatment execution (e.g., due to inaccurate positioning of a patient relative to a treatment apparatus). One solution is to introduce a high-precision device in the CT system, such as a control system or a reference ionization chamber, which may increase the cost of hardware. Another solution is to correct the projection images corresponding to different gantry angles, and then reconstruct the CT image based on the corrected projection images, which may be unsuitable for a scan in which the gantry rotates less than 360 degrees (e.g., the gantry rotates 200 degrees in CBCT). Thus, it is desirable to reconstruct a CT image by simultaneously correcting the inconsistency between a plurality of projection images to reduce or mitigate the effect of the fluctuation of the radiation doses at the different gantry angles.

SUMMARY

According to one aspect of the present disclosure, a system for computed tomography (CT) image reconstruction is provided. The system may include at least one storage medium including a set of instructions, and at least one processor in communication with the at least one storage medium. When executing the instructions, the at least one processor may be configured to direct the system to perform the following operations. The at least one processor may be configured to direct the system to obtain a plurality of projection images of a subject. The plurality of projection images may be generated according to scan data acquired by a CT scanner at a plurality of gantry angles, each of the plurality of projection images corresponding to one of the plurality of gantry angles. The at least one processor may be also configured to direct the system to determine attenuation information of the plurality of projection images. The at least one processor may be further configured to direct the system to reconstruct a CT image of the subject by simultaneously solving correction coefficients of the plurality of projection images such that a difference between estimated attenuation information of the plurality of projection images and the attenuation information of the plurality of projection images is minimized. The estimated attenuation information of the plurality of projection images may relate to the CT image and the correction coefficients of the plurality of projection images.

In some embodiments, the estimated attenuation information of the plurality of projection images may further relate to a coefficient matrix of the CT scanner.

In some embodiments, the coefficient matrix of the CT scanner may relate to at least one of a system geometry of the CT scanner, a focus shape of a radiation source of the CT scanner, a detector response of a detector of the CT scanner, a detection sensitivity of the detector, a collimator scatter, or an object scatter.

In some embodiments, to reconstruct a CT image by simultaneously solving correction coefficients of the plurality of projection images, the at least one processor may be further configured to direct the system to construct an estimated attenuation information function of the plurality of projection images. The estimated attenuation information function may relate to the correction coefficients of the projection images, the coefficient matrix of the CT scanner, and the CT image. The at least one processor may be also configured to direct the system to construct a cost function of attenuation information configured to measure a difference between the estimated attenuation information of the plurality of projection images and the attenuation information of the plurality of projection images, and determine the CT image and the correction coefficients of the plurality of projection images by minimizing a value of the cost function of attenuation information.

In some embodiments, the CT image may be a least squares solution of the cost function of attenuation information.

In some embodiments, the determining the CT image and the correction coefficients of the plurality of projection images by minimizing the cost function of attenuation information may be performed based on an iterative algorithm.

In some embodiments, the correction coefficients of the plurality of projection images may satisfy one or more constraints, the one or more constraints relating to at least one of a value range of the correction coefficients or a relationship between the correction coefficients of the projection images that correspond to neighboring gantry angles.

In some embodiments, to determine attenuation information of the plurality of projection images, the at least one processor may be further configured to direct the system to preprocess the plurality of projection images, and determine attenuation information of the plurality of preprocessed projection images. The reconstructing a CT image of the subject by simultaneously solving correction coefficients of the plurality of projection images may further include reconstructing the CT image of the subject by simultaneously solving correction coefficients of the plurality of preprocessed projection images such that a difference between estimated attenuation information of the plurality of preprocessed projection images and the attenuation information of the plurality of preprocessed projection images is minimized. The estimated attenuation information of the plurality of preprocessed projection images may relate to the CT image and the correction coefficients of the plurality of preprocessed projection images.

In some embodiments, the preprocessing of the plurality of projection images may include at least one of a defect pixel correction, a dark field correction, a gain correction, a geometric correction, a beam hardening correction, or a scattering correction.

According to another aspect of the present disclosure, a method for computed tomography (CT) image reconstruction is provided. The method may include obtaining a plurality of projection images of a subject. The plurality of projection images may be generated according to scan data acquired by a CT scanner at a plurality of gantry angles, each of the plurality of projection images corresponding to one of the plurality of gantry angles. The method may also include determining attenuation information of the plurality of projection images. The method may further include reconstructing a CT image of the subject by simultaneously solving correction coefficients of the plurality of projection images such that a difference between estimated attenuation information of the plurality of projection images and the attenuation information of the plurality of projection images is minimized. The estimated attenuation information of the plurality of projection images may relate to the CT image and the correction coefficients of the plurality of projection images.

According to still another aspect of the present disclosure, a non-transitory computer-readable storage medium including instructions may be provided. When accessed by at least one processor of a system, the non-transitory computer-readable storage medium may cause the system to perform a method. The method may include obtaining a plurality of projection images of a subject. The plurality of projection images may be generated according to scan data acquired by a CT scanner at a plurality of gantry angles, each of the plurality of projection images corresponding to one of the plurality of gantry angles. The method may also include determining attenuation information of the plurality of projection images. The method may further include reconstructing a CT image of the subject by simultaneously solving correction coefficients of the plurality of projection images such that a difference between estimated attenuation information of the plurality of projection images and the attenuation information of the plurality of projection images is minimized. The estimated attenuation information of the plurality of projection images may relate to the CT image and the correction coefficients of the plurality of projection images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for reconstructing a CT image according to some embodiments of the present disclosure

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "device," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts.

Figure 2:
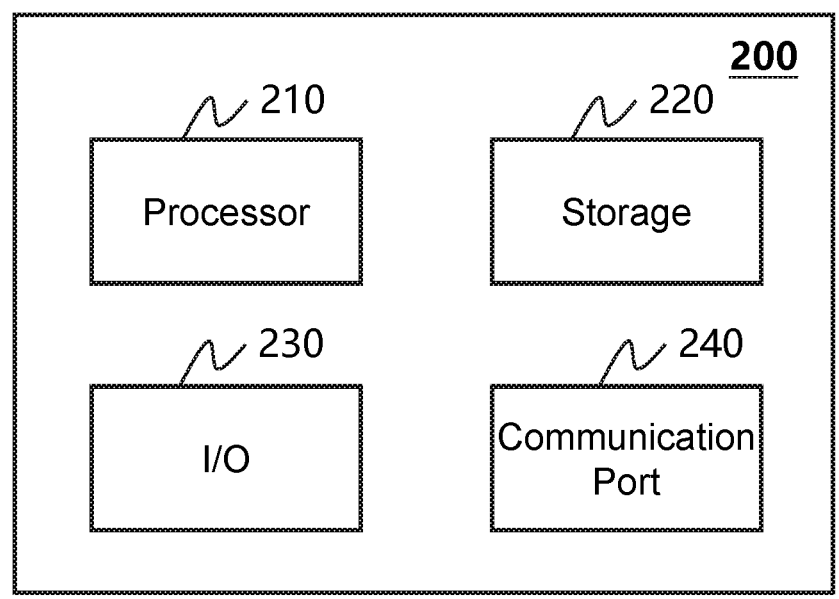
FIG. 2 is a schematic diagram illustrating exemplary hardware and/or software components of a computing device according to some embodiments of the present disclosure.

Software modules/units/blocks configured for execution on computing devices (e.g., a processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, a device, or a portion thereof.

It will be understood that when a unit, device, module or block is referred to as being "on," "connected to," or "coupled to," another unit, device, module, or block, it may be directly on, connected or coupled to, or communicate with the other unit, device, module, or block, or an intervening unit, device, module, or block may be present, unless the context clearly indicates otherwise. As used herein, the term "and/or" includes any and all combinations of one or more of the associated listed items. The term "pixel" and "voxel" in the present disclosure are used interchangeably to refer to an element in an image. The term "image" in the present disclosure is used to refer to images of various forms, including a 2-dimensional image, a 3-dimensional image, a 4-dimensional image, etc.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for CT image reconstruction. The systems and methods may obtain a plurality of projection images of a subject. The projection images may be generated according to scan data acquired by a CT scanner at a plurality of gantry angles, and each projection image may correspond to one of the gantry angles. The systems and methods may also determine attenuation information of the projection images. The systems and methods may further reconstruct a CT image of the subject by simultaneously solving correction coefficients of the projection images. In some embodiments, the CT image and the correction coefficients may be jointly determined such that a difference between estimated attenuation information of the projection images and the attenuation information of the projection images is minimized, wherein the estimated attenuation information of the projection images may relate to the CT image and the correction coefficients.

According to some embodiments of the present disclosure, a radiation dose of an X-ray imaging source delivered to the subject may fluctuate when a gantry of the CT scanner rotates, which may cause an inconsistency between projection images determined based on scan data so acquired. During the reconstruction of a CT image based on the acquired scan data, the correction coefficients of the projection images may be simultaneously determined to reduce the inconsistency between the projection images, thus improving the imaging quality of the reconstructed CT image. The systems and methods disclosed in the present disclosure may be implemented without a high precision device, such as a high-precision reference ionization chamber, a high-precision X-ray radiation source, or a high-precision control system. This may reduce equipment cost. In addition, the systems and methods disclosed in the present disclosure may be applied in various scan scenarios, not only suitable for a scan in which the gantry rotates 360 degrees or more, but also suitable for a scan in which the gantry rotates less than 360 degrees or more than 360 degrees.

Figure 1:
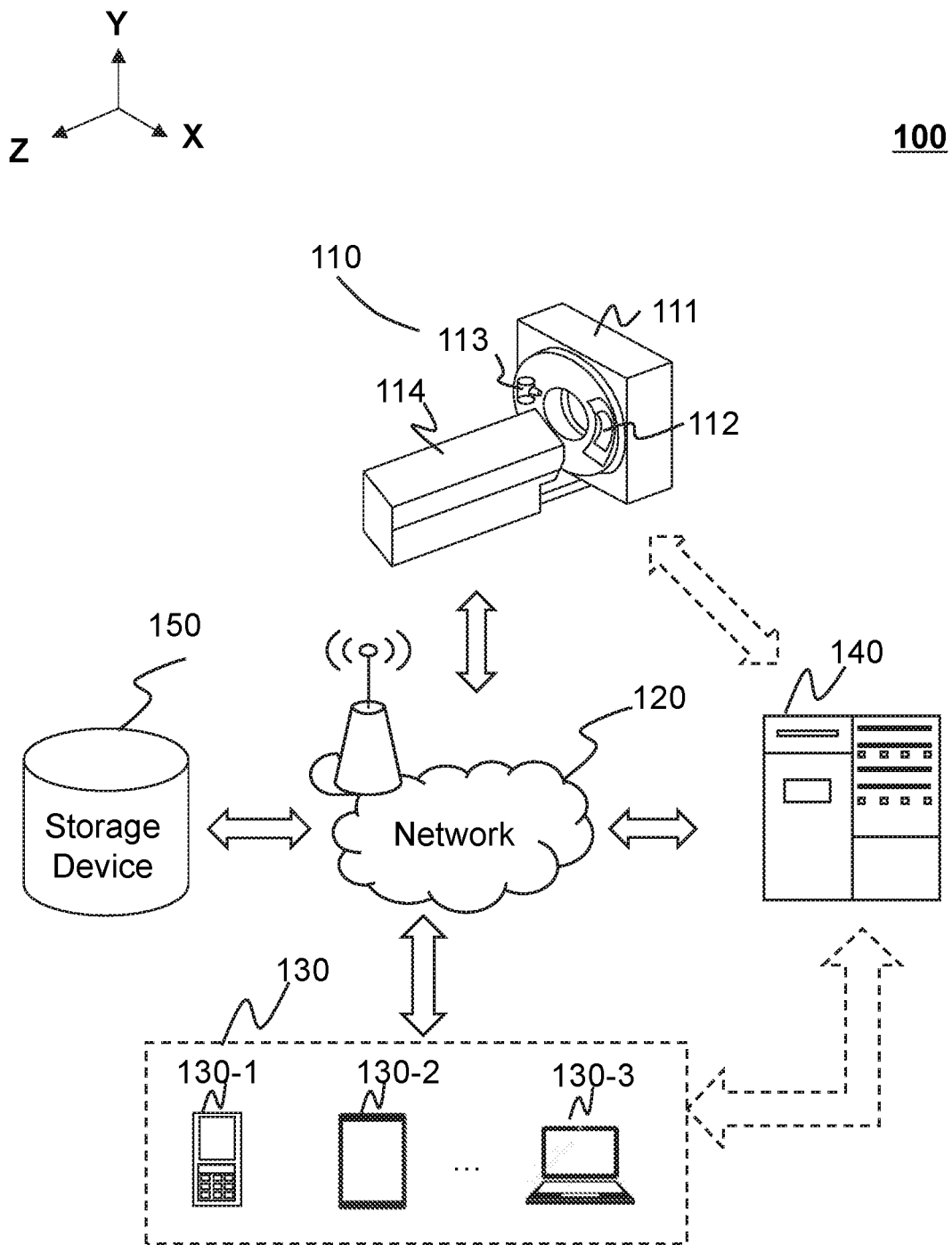
FIG. 1 is a schematic diagram illustrating an exemplary CT system according to some embodiments of the present disclosure.

FIG. 1 is schematic diagrams illustrating an exemplary CT system 100 according to some embodiments of the present disclosure. In some embodiments, the CT system 100 may include a conventional CT system, a cone beam CT (CBCT) system, a helical CT system, a multi-slice CT system, a digital subtraction angiography (DSA) system, or the like, or any combination thereof. In some embodiments, the CT system 100 may be a multi-modality imaging system, such as a positron emission tomography-computed tomography (PET-CT) system.

As illustrated in FIG. 1, the CT system 100 may include a CT scanner 110, a network 120, a terminal 130, a processing device 140, and a storage device 150. The components of the CT system 100 may be connected to each other in one or more of various ways. Merely by way of example, the CT scanner 110 may be connected to the processing device 140 via the network 120. As another example, the CT scanner 110 may be connected to the processing device 140 directly. As a further example, the storage device 150 may be connected to the processing device 140 directly or via the network 120. As still a further example, the terminal 130 may be connected to the processing device 140 directly or via the network 120.

The CT scanner 110 may include a gantry 111, a detector 112, a radiation source 113, and a scanning table 114. The detector 112 and the radiation source 113 may be oppositely mounted to the gantry 111. A subject may be placed on the scanning table 114 and moved into a detection tunnel of the CT scanner 110. For illustration purposes, a reference coordinate system as shown in FIG. 1 is introduced. The reference coordinate system may be an orthogonal coordinate system formed by an X-axis, a Y-axis, and a Z-axis. The X axis and the Z axis shown in FIG. 1 may be horizontal, and the Y-axis may be vertical. As illustrated, the positive X direction along the X axis may be from the left side to the right side of the CT scanner 110 seen from the direction facing the front of the CT scanner 110; the positive Y direction along the Y axis shown in FIG. 1 may be from the lower part to the upperpart of the CT scanner 110; the positive Z direction along the Z-axis shown in FIG. 1 may refer to a direction in which the subject is moved out of the scanning channel of the CT scanner 110.

The radiation source 113 may emit X-rays to scan a subject that is placed on the scanning table 114. The subject may be a biological subject (e.g., a patient, an animal) or a non-biological subject (e.g., a human-made subject, such as a human phantom or a water phantom). In the present disclosure, "object" and "subject" are used interchangeably. The detector 112 may detect radiation (e.g., X-rays) emitted from the radiation source 113. In some embodiments, the detector 112 may include a plurality of detector units. The detector units may include a scintillation detector (e.g., a cesium iodide detector) or a gas detector. The detector units may be arranged in a single row or multiple rows.

In some embodiments, the CT scanner 110 may include one or more components configured to prevent or reduce beam hardening and/or radiation scattering during a scan. For example, the CT scanner 110 may include a grid (e.g., an anti-scatter grid), and/or any other component that may prevent or reduce beam hardening. As another example, the CT scanner 110 may include an X-ray collimator, a metal grid, a slit, a beam stop array (BSA), a beam attenuation grid (BAG), and/or any other component that may prevent or reduce radiation scattering.

The network 120 may facilitate the exchange of information and/or data. In some embodiments, one or more components of the CT system 100 (e.g., the CT scanner 110, the terminal 130, the processing device 140, or the storage device 150) may send information and/or data to another component(s) in the CT system 100 via the network 120. For example, the processing device 140 may obtain scan data from the CT scanner 110 via the network 120. As another example, the processing device 140 may obtain user instruction(s) from the terminal 130 via the network 120. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the CT system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal 130 may remotely operate the CT scanner 110. In some embodiments, the terminal 130 may operate the CT scanner 110 via a wireless connection. In some embodiments, the terminal 130 may receive information and/or instructions inputted by a user, and send the received information and/or instructions to the CT scanner 110 or to the processing device 140 via the network 120. In some embodiments, the terminal 130 may receive data and/or information from the processing device 140. In some embodiments, the terminal 130 may be part of the processing device 140 or the CT scanner 110. In some embodiments, the terminal 130 may be omitted.

The processing device 140 may process data and/or information related to the CT system 100, such as information obtained from the CT scanner 110, the storage device 150, the terminal 130, or other components of the CT system 100. For example, the processing device 140 may obtain a plurality of projection images of a subject corresponding to a plurality of gantry angles. The processing device 140 may further reconstruct a CT image of the subject based on the plurality of projection images and corresponding correction coefficients, wherein correction coefficients of the projection images may be simultaneously solved during the reconstruction.

In some embodiments, the processing device 140 may include one or more processors (e.g., single-core processor(s) or multi-core processor(s)). Merely by way of example, the processing device 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the processing device 140 may be a single server or a server group. The server group may be centralized or distributed. In some embodiments, the processing device 140 may be local to or remote from the CT system 100. For example, the processing device 140 may access information and/or data stored in the CT scanner 110, the terminal 130, and/or the storage device 150 via the network 120. As another example, the processing device 140 may be directly connected to the CT scanner 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the CT scanner 110, the terminal 130, and/or the processing device 140. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the CT system 100 (e.g., the CT scanner 110, the terminal 130, and/or the processing device 140). One or more components of the CT system 100 may access the data or instructions stored in the storage device 150 via the network 120. In some embodiments, the storage device 150 may be directly connected to or communicate with one or more components of the CT system 100 (e.g., the CT scanner 110, the terminal 130, and/or the processing device 140). In some embodiments, the storage device 150 may be part of the processing device 140.

It should be noted that the above description of the CT system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the CT system 100 may include one or more additional components. Additionally or alternatively, one or more components of the CT system 100 described above may be omitted. As another example, two or more components of the CT system 100 may be integrated into a single component.

FIG. 2 is a schematic diagram illustrating exemplary hardware and/or software components of a computing device 200 according to some embodiments of the present disclosure. The computing device 200 may be used to implement any component of the CT system 100 as described herein. For example, the processing device 140 and/or the terminal 130 may be implemented on the computing device 200, respectively, via its hardware, software program, firmware, or a combination thereof. Although only one such computing device is shown, for convenience, the computer functions relating to the CT system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor may execute computer instruction to reconstruct a CT image based on a plurality of projection images corresponding to a plurality of gantry angles by simultaneously correcting an inconsistency between the plurality of projection images.

In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the CT scanner 110, the terminal 130, the storage device 150, or any other component of the CT system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program (e.g., in the form of computer-executable instructions) for CT image reconstruction.

The I/O 230 may input and/or output signals, data, information, etc. In some embodiments, the I/O 230 may enable a user interaction with the processing device 140. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 140) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), and/or a touch screen), a speaker, a printer, or the like, or a combination thereof.

The communication port 240 may be connected to a network (e.g., the network 120) to facilitate data communications. The communication port 240 may establish connections between the processing device 140 and the CT scanner 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
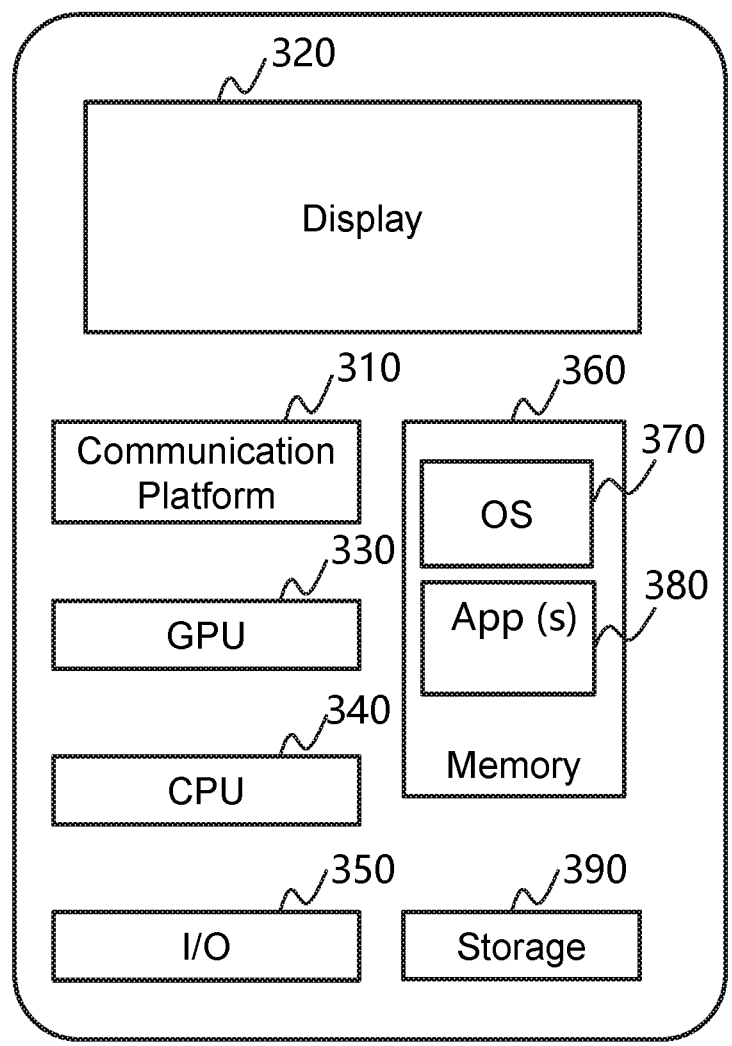
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal 130 and/or the processing device 140) of the CT system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information related to the CT system 100. User interactions with the information stream may be achieved via the I/O 350 and provided to the processing device 140 and/or other components of the CT system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
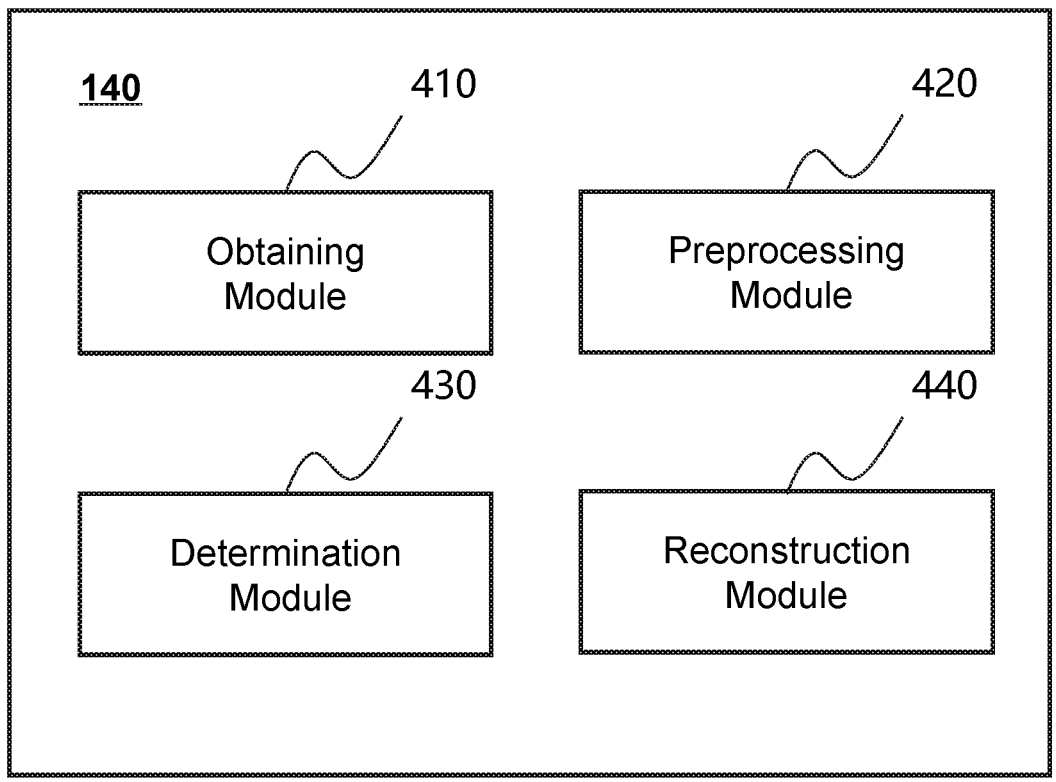
FIG. 4 is a block diagram illustrating an exemplary processing device according to some embodiments of the present disclosure.

FIG. 4 is a block diagram illustrating an exemplary processing device 140 according to some embodiments of the present disclosure. In some embodiments, the processing device 140 may be implemented on the computing device 200 (e.g., the processor 210) as illustrated in FIG. 2 or the CPU 340 as illustrated in FIG. 3.

As shown in FIG. 4, the processing device 140 may include an obtaining module 410, a preprocessing module 420, a determination module 430, and a reconstruction module 440. The obtaining module 410 may be configured to obtain information related to the CT system 100. The information may include scan parameters (e.g., one or more gantry angles, a radiation dose), image data (e.g., one or more projection images), or the like, or any combination thereof. For example, the obtaining module 410 may obtain a plurality of projection images of a subject. The plurality of projection images may be generated according to scan data acquired by the CT scanner 110 at a plurality of gantry angles. More descriptions regarding the obtaining of the projection images may be found elsewhere in the present disclosure. See, e.g., operation 510 of the process 500 and relevant descriptions thereof.

The preprocessing module 420 may be configured to preprocess an image. For example, the preprocessing module 420 may preprocess a projection image. The preprocessing of a projection image may include a defect pixel correction, a dark field correction, a gain correction, a geometry correction, a beam hardening correction, a scattering correction, or the like, or any combination thereof. In some embodiments, the preprocessing of a projection image may include a beam hardening correction and/or a scattering correction. More descriptions regarding the beam hardening correction and/or the scattering correction may be found elsewhere in the present disclosure. See, e.g., FIG. 5 and relevant descriptions thereof.

The determination module 430 may be configured to determine attenuation information of a projection image and/or a preprocessed projection image. For example, the determination module 430 may determine the attenuation information of a projection image. The attenuation information of the projection image may include, for each of the plurality of pixels in the projection image, a cumulative attenuation result of a plurality of physical points that a corresponding radiation ray traverses. In some embodiments, the attenuation information of the projection image may be determined according to gray values of the pixels in the projection image. More descriptions regarding the determination of the attenuation information of a projection image and/or a preprocessed projection image may be found elsewhere in the present disclosure. See, e.g., FIG. 5 and relevant descriptions thereof.

The reconstruction module 440 can be configured to reconstruct a CT image by simultaneously solving correction coefficients of a plurality of projection images corresponding to a plurality of gantry angles. More descriptions regarding the reconstruction of the CT image by simultaneously solving correction coefficients of the plurality of projection images may be found elsewhere in the present disclosure (e.g., operation 530 of the process 500), and the descriptions thereof are not repeated here.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. It should be noted that the above description regarding the processing device 140 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, two or more of the modules may be combined into a single module, and any one of the modules may be divided into two or more units. For example, the preprocessing module 420 and the determination module 430 may be integrated into a single module. In some embodiments, the processing device 140 may include one or more additional modules. For example, the processing device 140 may include a storage module configured to store data generated by any component of the processing device 140. As another example, the processing device 140 may include a post-processing module. The post-processing module may be configured to perform post-processing (e.g., a histogram equalization, an image desquamation, an image correction) on an image (e.g., a reconstructed CT image).

FIG. 5 is a flowchart illustrating an exemplary process for reconstructing a CT image according to some embodiments of the present disclosure. In some embodiments, the process 500 may be implemented on the CT system 100 illustrated in FIG. 1. For example, the process 500 may be stored in a storage device (e.g., the storage device 150 and/or the storage 220) in the form of instructions (e.g., an application), and invoked and/or executed by the processing device 140 (e.g., the processor 210 illustrated in FIG. 2, the CPU 340 of the mobile device 300, and/or one or more modules of the processing device 140 illustrated in FIG. 4).

In 510, the processing device 140 (e.g., the obtaining module 410) may obtain a plurality of projection images of a subject. The subject may be a biological subject (e.g., a patient, an animal, an organ, tissue) or a non-biological subject (e.g., a water phantom).

In some embodiments, the plurality of projection images may be generated according to scan data acquired by a CT scanner (e.g., the CT scanner 110) at a plurality of gantry angles. Each of the plurality of projection images may correspond to one of the plurality of gantry angles. For example, the CT scanner 110 may perform a scan of the subject by irradiating the subject with X-rays. During the scan, the radiation source 113 and the detector 112 may rotate with the gantry 111 around the Z-axis to scan the subject at different gantry angles. The scan data of the subject may include a plurality of sets of data corresponding to the plurality of gantry angles. The processing device 140 and/or the CT scanner 110 may generate the projection images corresponding to the plurality of gantry angles according to the sets of data, and transmit the projection images to the obtaining module 410. Alternatively, the processing device 140 and/or the CT scanner 110 may transmit the projection images to a storage device (e.g., the storage device 150) for storage and/or future use. The obtaining module 410 may access the storage device and retrieve one or more of the projection images.

In some embodiments, a gantry angle may refer to an angle formed by a line connecting the radiation source 113 and the rotation center of the gantry 111 and a reference system (e.g., the X-axis or the Y-axis as illustrated in FIG. 1). The gantry angles of the projection images acquired in 510 may range from, for example, 0° to 90°, 0° to 360°, 90° to 360°, etc. In some embodiments, the radiation source 113 may emit X-rays toward the subject continuously when the gantry 111 rotates. During a continuous emission, the radiation source 113 may continue or substantially continue emitting radiations, for example, the radiation source 113 may briefly stop emitting radiations for a period shorter than a threshold period or a period in which the radiation source 113 moves for a distance shorter than a threshold distance, and resume emitting radiations after the period. For example, the gantry angles may range from 0° to 360°, and 1,200 sets of scan data corresponding to 1,200 gantry angles may be collected by the detector 112. Accordingly, 1,200 projection images, one projection image corresponding to each of the 1,200 gantry angles, may be generated. As another example, the gantry angles may range from 0° to 360°, and 2,400 sets of scan data corresponding to 2,400 gantry angles may be collected by the detector 112. Accordingly, 2,400 projection images, one projection image corresponding to each of the 2,400 gantry angles, may be generated. Alternatively, the radiation source 113 may emit X-rays toward the subject intermittently. During an intermittent emission, the radiation source 113 may intermittently stop emitting radiations for a period longer than a threshold period or a period in which the radiation source 113 moves for a distance longer than a threshold distance, and resume emitting radiations after the period. For example, the gantry angles may range from 0° to 360°, and the radiation source 113 may emit X-rays toward the subject in every 1° change in the gantry angle. Accordingly, 360 projection images may be generated. As another example, the gantry angles may range from 0° to 360°, and the radiation source 113 may emit X-rays toward the subject in every 0.5° change in the gantry angle. Accordingly, 720 projection images may be generated. In some embodiments, the gantry 111 may rotate for multiple rotations during a scan. In each rotation, the radiation source 113 may emit X-rays toward the subject at a plurality of gantry angles. Thus, for each gantry angle, a plurality of sets of projection data may be acquired and a plurality of projection images corresponding to the gantry angle may be generated. In some occasions, the radiation doses emitted by the radiation source 113 at a same gantry angle in different rotations may fluctuate, and the projection images corresponding to the same gantry angle may need to be corrected.

In some embodiments, a gantry angle of a projection image may be obtained from one or more components of the CT system 100, such as an encoder of gantry angles. Additionally or alternatively, a gantry angle of a projection image may be determined based on data analysis of one or more other projection images. Merely by way of example, it is assumed that there are a projection image $P_\alpha$ corresponding to a known gantry angle $\alpha$, a projection image $P_\beta$ corresponding to a known gantry angle $\beta$, and a projection image $P_\gamma$ corresponding to an unknown gantry angle $\gamma$. The gantry angle $\gamma$ may be greater than the gantry angle $\alpha$ and smaller than the gantry angle and be determined by analyzing the projection images $P_\alpha$, $P_\beta$, and $P_\gamma$ using an interpolation algorithm.

In some embodiments, a projection image may be a 2D image including a plurality of pixels. Each pixel may have a pixel value, such as a grey-scale value, a luminance value, or the like, or any combination thereof. The pixel value (e.g., a grey-scale value) of a pixel may have a linear relationship with the radiation dose delivered to the subject. When the gantry 111 rotates, the radiation dose emitted by the radiation source 113 may fluctuate, which may result in a difference between actual gray values and ideal gray values of the pixels in the projection image. During CT image reconstruction, the pixel values of the pixels in a projection image may correlate with attenuation coefficients of portions of the subject that the radiation traverses. For instance, the logarithm of the pixel values of the pixels in a projection image may positively correlate with attenuation coefficients of portions of the subject that the radiation traverses. The difference between the actual pixel values and the ideal pixel values of the projection image may affect the quality of a CT image reconstructed based on the projection images. A method for CT image reconstruction is provided in the present disclosure. The method may correct the projection image during the reconstruction of the CT image to reduce the influence of the fluctuation of the radiation doses at different gantry angles.

In 520, the processing device 140 (e.g., the determination module 430) may determine attenuation information of the plurality of projection images.

The attenuation information of the projection images may include attenuation information of each projection image. The attenuation information of a projection image may include, for each of the plurality of pixels in the projection image, a cumulative attenuation result of a plurality of spatial points (e.g., spatial points within or on the subject, spatial point outside the subject) that one or more corresponding radiation rays traverse. A radiation ray corresponding to a pixel may refer to a radiation ray impinging on a detector unit that acquires scan data corresponding to the pixel. In some embodiments, the attenuation information of a projection image may be determined according to gray values of the pixels in the projection image. Merely by way of example, for a pixel in a projection image, the cumulative attenuation result of a plurality of spatial points that a radiation ray traverses corresponding to the pixel may be determined by performing a logarithm transformation on the grey value of the pixel. Since the grey values of the pixels in a projection image are data measured in the CT scan, the attenuation information of the projection image determined based on the grey values may be regarded as actual attenuation information of the projection image.

In 530, the processing device 140 (e.g., the reconstruction module 440) may reconstruct a CT image by simultaneously solving correction coefficients of the plurality of projection images. The CT image and the correction coefficients of the projection images may be so as to minimize a difference between estimated attenuation information of the projection images and the attenuation information of the projection images.

In some embodiments, a correction coefficient of a projection image may be used to correct the projection image to reduce or mitigate the influence of the fluctuation of the radiation dose of the radiation source 113. In some embodiments, the correction coefficient of the projection image may be a constant. For example, the correction coefficient may be a constant real number applied to the entire projection image. As another example, the correction coefficient may be a vector or a matrix which applies possibly unique factors to different pixels in the projection image. The correction coefficients corresponding to different projection images may be the same or different. In some embodiments, a projection image may be corrected by multiplying the projection image by its corresponding correction coefficient.

In some embodiments, the estimated attenuation information of the projection images may relate to the CT image of the subject and the correction coefficients of the projection images. For instance, the estimated attenuation information of the projection images may be represented by an estimated attenuation information function which incorporates the correction coefficients of the projection images and the CT image. In some embodiments, the estimated attenuation information of the projection images may further relate to a coefficient matrix (also referred to as a system matrix) of the CT scanner 110. For instance, the estimated attenuation information of the projection images may be represented by an estimated attenuation information function which incorporates the correction coefficients of the projection images, the CT image, and the coefficient matrix of the CT scanner 110. The coefficient matrix of the CT scanner 110 may relate to one or more factors including, e.g., a system geometry in the CT scanner 110, a focus shape of the radiation source 113, a detector response, a detection sensitivity of the detector 112 (e.g., detection sensitivities of a plurality of detector units of the detector 112), an object scatter, a collimator scatter, one or more geometric or physical parameters, or any combination thereof. Exemplary geometric parameters may include a distance between the radiation source 113 and the detector 112, a shape of the detector 112 (e.g., curved or planar), a range of gantry angles, or the like, or any combination thereof. In some embodiments, the coefficient matrix of the CT scanner 110 may be obtained by performing a Radon or x-ray transformation on one or more of the factors described above. In some embodiments, the CT scanner 110 may have different coefficient matrixes corresponding to different gantry angles. In some embodiments, a coefficient matrix may include multiple elements. An element of the coefficient matrix may be proportional to a probability that a radioactive decay event located within a volume defined by a certain voxel is recorded by a certain detector unit of the CT scanner 110.

In some embodiments, the processing device 140 may construct an estimated attenuation information function of the plurality of projection image. The processing device 140 may further construct a cost function of attenuation information configured to measure a difference between the estimated attenuation information of the projection images and the attenuation information of the projection images. Then, the processing device 140 may determine the CT image and the correction coefficients of the projection images by minimizing a value of the cost function of attenuation information. The minimized value of the cost function may be regarded as the minimized difference between the estimated attenuation information of the projection images and the attenuation information of the projection images. Alternatively, the processing device 140 may construct the cost function of attenuation information directly, wherein the constructed cost function may include an estimated attenuation information function of the projection images. Merely by way of example, an example of the cost function is described hereinafter. For example, assuming that the number (or count) of the projection images is x, the cost function of attenuation information may be described according to Equation (1):

$$\text{Cost} = \|P - KAa\|, \quad (1)$$

where Cost refers to the cost function of attenuation information; P refers to a set of attenuation information, which includes the attenuation information of each projection image; K refers to a set of correction coefficients, which includes the correction coefficient of each projection image; A refers to a set of the coefficient matrixes of the CT scanner 110, which includes the coefficient matrix of the CT scanner 110 at each gantry angle; a refers to the CT image to be reconstructed, which includes a plurality of voxels and attenuation coefficients of physical points corresponding to the voxels; and KAa represents the estimated attenuation information of the projection images. In Equation (1), P and A may be known, while K and a may be unknown parameters to be solved. In some embodiments, the norm in Equation (1) may be a L2-norm, a L1-norm, or any other parameter that can measure the difference between the actual attenuation information and estimated attenuation information the projection images.

In some embodiments, the attenuation information of each projection image may be a vector. For example, the attenuation information of a projection image may be a m*1 vector, wherein m may be equal to the count (or number) of pixels in the projection image (e.g., 1024*1024) and each element of the vector may represent attenuation information of a corresponding pixel in the projection image. The set of attenuation information P may be represented as $\{P_1, P_2, \ldots, P_x\}$, which may be an M*1 vector, wherein M=x*m. The correction coefficient of each projection image may be a constant or a matrix, and the set of the correction coefficients K may be a diagonal matrix including the correction coefficients of the projection images. In some embodiments, K may be an M*M diagonal matrix. The diagonal elements of the diagonal matrix may be the correction coefficients of the projection images. In some embodiments, all the diagonal elements of the diagonal matrix may be the same. In some embodiments, at least two of the diagonal elements of the diagonal matrix may be different from each other. In some embodiments, at least two of the diagonal elements of the diagonal matrix may be different from each other, and at least two of the diagonal elements of the diagonal matrix may be the same as each other. When all the diagonal elements are the same as each other, the set of the correction coefficients K may be equivalent to a constant, which indicates the difference between actual pixel values and ideal pixel values caused by the fluctuation of the radiation doses at the x gantry angles. When at least two of the diagonal elements are different, the set of the correction coefficients K may indicate the difference caused by the fluctuation of the radiation dose at the x gantry angles as well as an influence of an angular distribution of the radiation source and a detector response at different pixels. In some embodiments, a coefficient matrix of the CT scanner 110 at a certain gantry angle may be an m*n matrix, wherein n may be equal to any suitable positive value. The set of the coefficient matrix A of the CT scanner 110 may be represented as $\{A_1, A_2, \ldots, A_x\}$, which is an M*n matrix. The reconstructed CT image α may be represented as an n*1 vector. In some embodiments, n may be equal to the number (or count) of voxels in the CT image, such as 256*256*256. In some embodiments, x, the number (or count) of the projection images, may be a positive integer, such as 180, 200, 360, or the like.

It should be noted that the Equation (1) is provided for illustration purposes, and not intend to limit the scope of the present disclosure. For example, the cost function may further include a regularity term configured to reduce noise and/or image artifact in the reconstructed CT image. In some embodiments, an optimal solution of the cost function (i.e., the reconstructed CT image and the correction coefficients that minimize the value of the cost function) may be determined based on an optimization algorithm. Optionally, the determination of the optimal solution may be decomposed into a plurality of sub-problems, and the plurality of sub-problems may be solved to determine the optimal solution.

In some embodiments, the determination of the optimal solution of the cost function (i.e., the reconstructed CT image and the correction coefficients that minimize the value of the cost function) may be an iterative process. In the iterative process, the cost function may be considered as being minimized if a termination condition is satisfied. Exemplary termination conditions may include that a certain number or count of iterations are performed, that a value of the cost function in a certain iteration is smaller than a threshold, that the cost function converges such that the differences of the values of the cost function obtained in consecutive iterations are within a threshold, or the like. In some embodiments, the iterative process may include a plurality of iterations. In the first iteration, a preliminary CT image and preliminary correction coefficients may be set. If the termination condition is not satisfied in a current iteration, the preliminary CT image and/or the preliminary correction coefficients in the current iteration may be updated according to the value of the cost function in the current iteration. The updated preliminary CT image and/or the updated correction coefficients may be designated as a preliminary CT image and/or preliminary correction coefficients in a next iteration, respectively, for further processing. If the termination condition is satisfied in a certain iteration, the preliminary CT image in the certain iteration may be designated as the reconstructed CT image and the preliminary correction coefficients may be designated as the correction coefficients. In some embodiments, the preliminary CT image and the preliminary correction coefficients may be updated in sequence in consecutive iterations. For example, only the preliminary CT image may be updated in a certain iteration, and only the preliminary correction coefficients may be updated in an iteration following the certain iteration. Alternatively, the preliminary CT image may be updated to determine the reconstructed CT image firstly in the iterative process (e.g., in a certain number of prior iterations), and the preliminary correction coefficients may be updated to determine the correction coefficients after the reconstructed CT image is determined, or vice versa.

In some embodiments, a desired value of the cost function may be set, and the cost function may be considered as being minimized if the value of the cost function is less than or equal to the set value. In some embodiments, the CT image may be a least-squares solution of the cost function. In some embodiments, the joint determination of the CT image and the correction coefficients may be performed according to an iterative reconstruction algorithm, a matrix inversion algorithm, a matrix pseudoinverse algorithm, or the like, or any combination thereof.

In some embodiments, the determined the correction coefficients and/or the CT image may satisfy the one or more constraints. An exemplary constraint may relate to a value range of the correction coefficients of the projection images. The determined correction coefficients of the projection images may need to be within the value range. Another exemplary constraint may relate to a relationship between the correction coefficients of the projection images that correspond to neighboring gantry angles. A first gantry angle and a second gantry angle may be regarded as neighboring gantry angles if the first gantry angle is closest to the second gantry angle among all gantry angles and/or if an angular difference between the first and second gantry angles is smaller than a threshold angle. The relationship between correction coefficients of projection images corresponding to neighboring gantry angles may include any relationship (e.g., a linear relationship, a non-linear relationship, etc.) that defines the values of the correction coefficients. Merely by way of example, for a first projection image and a second projection image corresponding to neighboring gantry angles, the relationship may be that the correction coefficient of the first projection image is smaller than a product (or a sum) of a certain constant coefficient and the correction coefficient of the second projection image. The constant coefficient may be any positive number, such as 0.8, 0.9, 1.1, 1.2, or the like. It should be noted that the above description about the constraints is provided for illustration purposes only, and not intended to be limiting.

It should be noted that the above description of the process 500 is provided for illustration purposes and is not intended to limit the scope of the present disclosure. For persons having ordinary skills in the art, multiple variations and modifications may be made under the teachings of the present disclosure. However, these modifications and changes do not depart from the scope of the present disclosure. The operations of the process illustrated in FIG. 5 are intended to be illustrative. In some embodiments, the process 500 may include one or more other operations. Alternatively, one or more operations in the process 500 may be omitted. Additionally, the order of the operations of the process 500 as illustrated in FIG. 5 may be changed, and not be limited to the descriptions below.

In some embodiments, before 520, the processing device 140 (e.g., the preprocessing module 420) may preprocess the projection images to generate a plurality of the preprocessed projection images corresponding to the gantry angles. The preprocessing of a projection image may include a defect pixel correction, a dark field correction, a gain correction, a geometric correction, a beam hardening correction, a scattering correction, or the like, or any combination thereof. In some embodiments, the preprocessing of a projection image may include a beam hardening correction and/or a scattering correction. The beam hardening correction may be performed based on a beam hardening correction algorithm. Exemplary beam hardening correction algorithms may include a polynomial fitting algorithm, a Monte Carlo simulation algorithm, an iterative correction algorithm, a dual energy correction algorithm, a single energy correction algorithm, or the like, or any combination thereof. The scattering correction may be performed based on a scattering correction algorithm. Exemplary scattering correction algorithms may include a convolution algorithm, a model assessing algorithm, a deconvolution algorithm, a Monte Carlo simulation algorithm, a single scatter simulation technique, a dual energy-window technique, a beam-stop technique, a frequency modulation technique, or the like, or any combination thereof.

In some embodiments, the preprocessing of a projection image corresponding to a gantry angle may be performed based on a radiation dose delivered to the subject at the gantry angle. The radiation dose delivered to the subject at the gantry angle may be a planned dose or a dose measured by an ionization chamber (if any) during the CT scanner 110 scans the subject at the gantry angle. For example, an intensity of X-rays passing through the subject may be determined based on the radiation dose delivered to the subject at the gantry angle. A scattering correction may be performed on the projection image based on the intensity of X-rays.

After the preprocessed projection images are generated, the processing device 140 may determine attenuation information of the preprocessed projection images. The determination of the attenuation information of the preprocessed projection images may be performed in a similar manner as the determination of the attenuation information of the projection images as described in connection with operation 520. Further, the processing device 140 may simultaneously determine the CT image of the subject and the correction coefficients of the preprocessed projection images. The CT image and correction coefficients of the preprocessed projection images may minimize the difference between estimated attenuation information of the preprocessed projection images and the attenuation information of the preprocessed projection images. The determination of the CT image and the correction coefficients of the preprocessed projection images may be performed in a similar manner as the determination of the CT image and the correction coefficients of the projection images as described in connection with in operation 530.

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification is provided for illustration purposes and may be modified according to different situations. For example, a classification condition that "a probability value is greater than the threshold value" may further include or exclude a condition that "the probability value is equal to the threshold value."

What is claimed is:

1. A system for computed tomography (CT) image reconstruction, comprising:
   at least one storage device including a set of instructions; and
   at least one processor configured to communicate with the at least one storage device, wherein when executing the set of instructions, the at least one processor is configured to direct the system to perform operations including:
      obtaining a plurality of projection images of a subject, the plurality of projection images being generated according to scan data acquired by a CT scanner at a plurality of gantry angles, each of the plurality of projection images corresponding to one of the plurality of gantry angles;
      for each of the plurality of projection images, determining attenuation information of the projection image by transforming grey values of a plurality of pixels of the projection image; and
      reconstructing a CT image of the subject by simultaneously solving correction coefficients of the plurality of projection images such that a difference between estimated attenuation information of the plurality of projection images and the attenuation information of the plurality of projection images is minimized, the estimated attenuation information of the plurality of projection images relating to the CT image and the correction coefficients of the plurality of projection images.

2. The system of claim 1, wherein the estimated attenuation information of the plurality of projection images further relates to a coefficient matrix of the CT scanner.

3. The system of claim 2, wherein the coefficient matrix of the CT scanner relates to at least one of a system geometry of the CT scanner, a focus shape of a radiation source of the CT scanner, a detector response of a detector of the CT scanner, a detection sensitivity of the detector, a collimator scatter, or an object scatter.

4. The system of claim 2, wherein to reconstruct a CT image by simultaneously solving correction coefficients of the plurality of projection images, the at least one processor is further configured to direct the system to perform additional operations including:
   constructing an estimated attenuation information function of the plurality of projection images, the estimated attenuation information function relating to the correction coefficients of the projection images, the coefficient matrix of the CT scanner, and the CT image;
   constructing a cost function of attenuation information configured to measure a difference between the estimated attenuation information of the plurality of projection images and the attenuation information of the plurality of projection images; and determining the CT image and the correction coefficients of the plurality of projection images by minimizing a value of the cost function of attenuation information.

5. The system of claim 4, wherein the CT image is a least squares solution of the cost function of attenuation information.

6. The system of claim 4, wherein the determining the CT image and the correction coefficients of the plurality of projection images by minimizing the cost function of attenuation information is performed based on an iterative algorithm.

7. The system of claim 1, wherein the correction coefficients of the plurality of projection images satisfy one or more constraints, the one or more constraints relating to at least one of a value range of the correction coefficients or a relationship between the correction coefficients of the projection images that correspond to neighboring gantry angles.

8. The system of claim 1, wherein to determine attenuation information of the plurality of projection images, the at least one processor is further configured to direct the system to perform additional operations including:

preprocessing the plurality of projection images; and determining attenuation information of the plurality of preprocessed projection images, wherein the reconstructing a CT image of the subject by simultaneously solving correction coefficients of the plurality of projection images further comprises:

reconstructing the CT image of the subject by simultaneously solving correction coefficients of the plurality of preprocessed projection images such that a difference between estimated attenuation information of the plurality of preprocessed projection images and the attenuation information of the plurality of preprocessed projection images is minimized, the estimated attenuation information of the plurality of preprocessed projection images relating to the CT image and the correction coefficients of the plurality of preprocessed projection images.

9. The system of claim 8, wherein the preprocessing of the plurality of projection images includes at least one of a defect pixel correction, a dark field correction, a gain correction, a geometric correction, a beam hardening correction, or a scattering correction.

10. A method for computed tomography (CT) image reconstruction, comprising:

obtaining a plurality of projection images of a subject, the plurality of projection images being generated according to scan data acquired by a CT scanner at a plurality of gantry angles, each of the plurality of projection images corresponding to one of the plurality of gantry angles;

for each of the plurality of projection images, determining attenuation information of the projection image by transforming grey values of a plurality of pixels of the projection image; and reconstructing a CT image of the subject by simultaneously solving correction coefficients of the plurality of projection images such that a difference between estimated attenuation information of the plurality of projection images and the attenuation information of the plurality of projection images is minimized, the estimated attenuation information of the plurality of projection images relating to the CT image and the correction coefficients of the plurality of projection images.

11. The method of claim 10, wherein the estimated attenuation information of the plurality of projection images further relates to a coefficient matrix of the CT scanner.

12. The method of claim 11, wherein the coefficient matrix of the CT scanner relates to at least one of a system geometry of the CT scanner, a focus shape of a radiation source of the CT scanner, a detector response of a detector of the CT scanner, a detection sensitivity of the detector, a collimator scatter, or an object scatter.

13. The method of claim 11, wherein the reconstructing a CT image of the subject by simultaneously solving correction coefficients of the plurality of projection images comprises:

constructing an estimated attenuation information function of the plurality of projection images, the estimated attenuation information function relating to the correction coefficients of the projection images, the coefficient matrix of the CT scanner, and the CT image;

constructing a cost function of attenuation information configured to measure a difference between the estimated attenuation information of the plurality of projection images and the attenuation information of the plurality of projection images; and determining the CT image and the correction coefficients of the plurality of projection images by minimizing a value of the cost function of attenuation information.

14. The method of claim 13, wherein the CT image is a least squares solution of the cost function of attenuation information.

15. The method of claim 13, wherein the determining the CT image and the correction coefficients of the plurality of projection images by minimizing the cost function of attenuation information is performed based on an iterative algorithm.

16. The method of claim 10, wherein the correction coefficients of the plurality of projection images satisfy one or more constraints, the one or more constraints relating to at least one of a value range of the correction coefficients or a relationship between the correction coefficients of the projection images that correspond to neighboring gantry angles.

17. The method of claim 10, wherein the determining attenuation information of the plurality of projection images comprises:

preprocessing the plurality of projection images; and determining attenuation information of the plurality of preprocessed projection images, wherein the reconstructing a CT image of the subject by simultaneously solving correction coefficients of the plurality of projection images further comprises:

reconstructing the CT image of the subject by simultaneously solving correction coefficients of the plurality of preprocessed projection images such that a difference between estimated attenuation information of the plurality of preprocessed projection images and the attenuation information of the plurality of preprocessed projection images is minimized, the estimated attenuation information of the plurality of preprocessed projection images relating to the CT image and the correction coefficients of the plurality of preprocessed projection images.

18. The method of claim 17, wherein the preprocessing of the plurality of projection images includes at least one of a defect pixel correction, a dark field correction, a gain correction, a geometric correction, a beam hardening correction, or a scattering correction.

19. A non-transitory computer-readable storage medium including instructions that, when accessed by at least one processor of a system, causes the system to perform a method, the method comprising:
   obtaining a plurality of projection images of a subject, the plurality of projection images being generated according to scan data acquired by a CT scanner at a plurality of gantry angles, each of the plurality of projection images corresponding to one of the plurality of gantry angles;
   for each of the plurality of projection images, determining attenuation information of the projection image by transforming grey values of a plurality of pixels of the projection image; and
   reconstructing a CT image of the subject by simultaneously solving correction coefficients of the plurality of projection images such that a difference between estimated attenuation information of the plurality of projection images and the attenuation information of the plurality of projection images is minimized, the estimated attenuation information of the plurality of projection images relating to the CT image and the correction coefficients of the plurality of projection images.

20. The non-transitory computer-readable storage medium of 19, wherein the reconstructing a CT image by simultaneously solving correction coefficients of the plurality of projection images comprises:
   constructing an estimated attenuation information function of the plurality of projection images, the estimated attenuation information function relating to the correction coefficients of the projection images, the coefficient matrix of the CT scanner, and the CT image;
   constructing a cost function of attenuation information configured to measure a difference between the estimated attenuation information of the plurality of projection images and the attenuation information of the plurality of projection images; and
   determining the CT image and the correction coefficients of the plurality of projection images by minimizing a value of the cost function of attenuation information.

* * * * *